Oct. 18, 1932.  M. H. TONCRAY ET AL  1,883,120
WINDSHIELD SECURING DEVICE
Filed Jan. 27, 1930  2 Sheets-Sheet 1

Inventors
Millard H. Toncray
James W. Grig
By Meacham, Calvin, Copeland & Pike
Attorneys

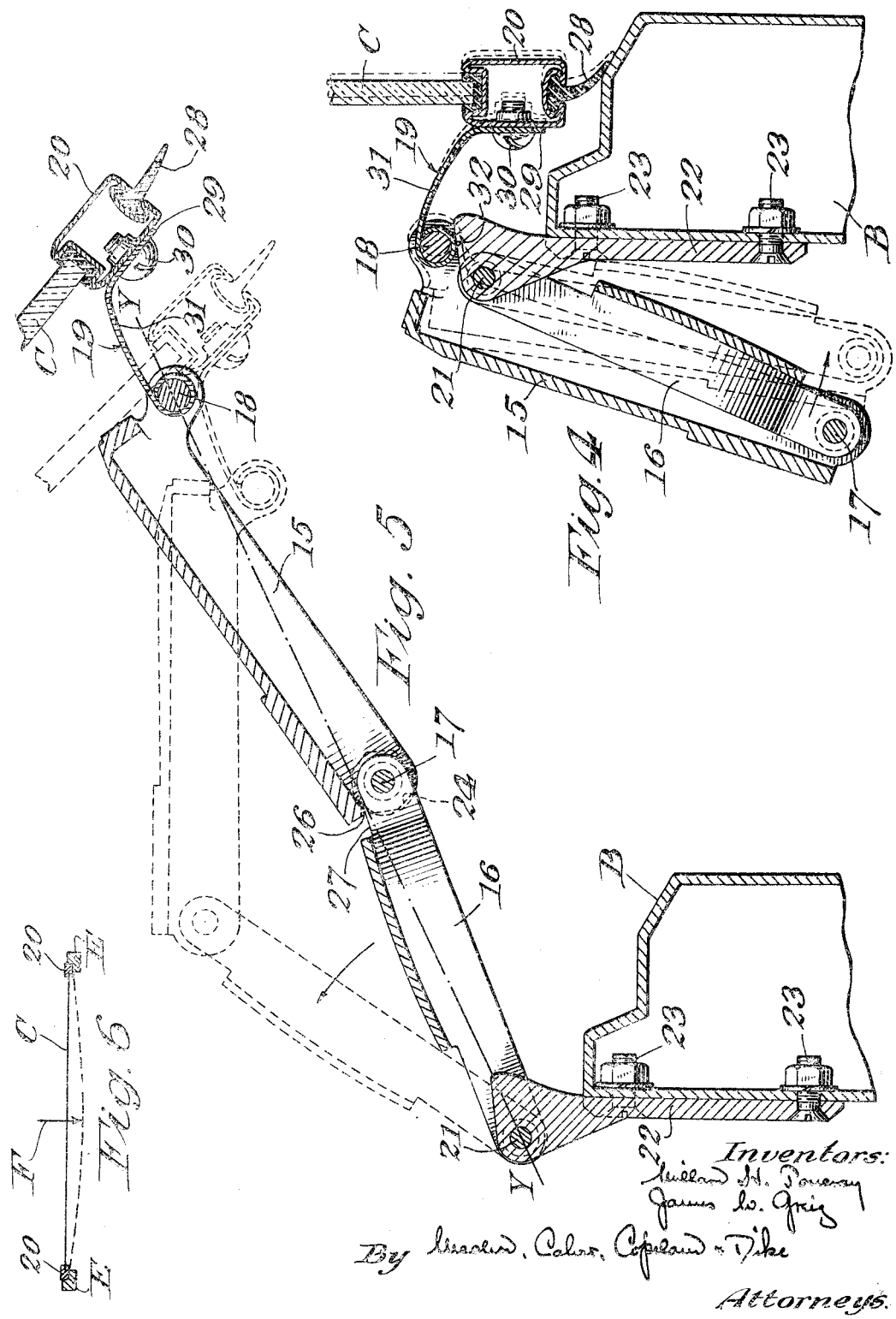

Patented Oct. 18, 1932

1,883,120

UNITED STATES PATENT OFFICE

MILLARD H. TONCRAY, OF DETROIT, AND JAMES W. GREIG, OF GROSSE POINTE PARK, MICHIGAN, ASSIGNORS TO HUDSON MOTOR CAR COMPANY, OF DETROIT, MICHIGAN, A CORPORATION OF MICHIGAN

WINDSHIELD SECURING DEVICE

Application filed January 27, 1930. Serial No. 423,597.

This invention relates to adjusting or securing devices for the windshields of motor and other vehicles.

For the purpose of securing or holding the windshield of a motor vehicle in either closed or open position, it has heretofore been customary to employ adjusting or securing devices at opposite ends of the windshield, that is to say, at opposite sides of the vehicle, each of said devices including some form of linkage together with clamps for securing the parts in adjusted position. With such an arrangement, when it is desired to open or close the windshield it is necessary to release the clamps at both sides of the vehicle, open or close the windshield, and thereafter tighten both clamps. It is difficult for the driver alone, without leaving his seat, to perform these operations which involve considerable trouble and require considerable time.

In order to facilitate the opening and closing of the windshield by the driver, it has been proposed to employ for the purpose in question a single self-locking device in the nature of a toggle located intermediate the ends of the windshield, whereby the driver can, by a single operation, and without leaving his seat, move the windshield into open or closed position, in either of which positions it will be automatically retained or supported by the toggle device. In practice, however, it has been found that, when such devices are used under actual driving conditions, the results of a sudden and violent road or other shock have been to break the windshield, if closed, or to cause the same to fly open, or both. For these reasons such devices, while theoretically advantageous, have been found to be impracticable in actual service.

We have discovered that the cause of the first of these phenomena, namely, the breakage of the windshield, lies in the fact that the pressure exerted by the toggle device upon the windshield in order to secure the same in tightly closed position and against rattling, being applied to the windshield at an unsupported point intermediate the ends of the latter, tends to spring the lower edge of the windshield out of its normal form, and, while this influence may in itself be insufficient to break the windshield glass, it puts upon it a strain which is likely to result in breakage under the influence of a sudden road or other shock.

As to the second of the above difficulties, namely, the tendency of the windshield to fly open, we have also discovered that, in devices of this character as heretofore constructed, the outward thrust or reaction of the windshield, when clamped in closed position, against the locking device has been so applied to the latter as to have a certain tendency to unlock the same, so that, while under normal conditions the locking resistance of the device has been sufficient to hold the windshield in closed position, a sudden jar has been sufficient to release the same.

The present invention has for its object to remedy the above conditions and to provide a single self-locking adjusting device for securing or holding a windshield in either closed or open position, which device can be operated by the driver to open or close the windshield by a single operation involving minimum effort, which will not exert upon the windshield any pressure of such a character as to cause the windshield to break under the influence of shocks or otherwise, and which, when in position to secure the windshield closed, is positively locked or supported against the outward thrust of the latter.

The more particular objects of the invention will best be understood from the following description of a preferred embodiment thereof illustrated in the accompanying drawings, but it will also be understood that the particular construction described and shown has been chosen for purposes of exemplification merely, and that the invention, as defined by the claims hereunto appended, may be otherwise embodied without departure from the spirit and scope thereof.

In said drawings:

Fig. 4 is a section taken substantially on the line 4—4, Fig. 2, showing in full lines of the positions of the parts at the beginning of the windshield opening movement, or just prior to the completion of the windshield closing movement, the fully closed and locked position of the parts being shown in broken lines.

Fig. 5 is a similar view showing in full lines the completely opened position of the windshield.

Fig. 6 is a diagrammatic horizontal section through the bottom of the windshield, illustrating the effect thereon of the clamping action of the securing device.

Figure 1:
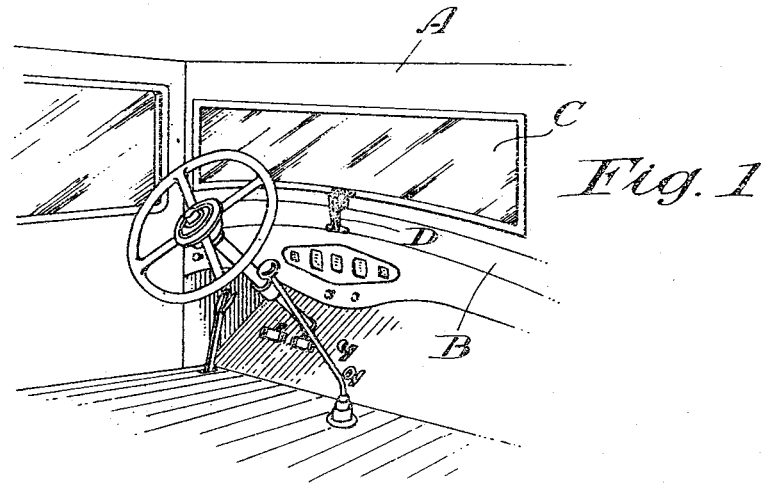
Fig. 1 is a fragmentary perspective view of the interior of the forward part of a motor vehicle body having the invention applied thereto.
Figure 2:
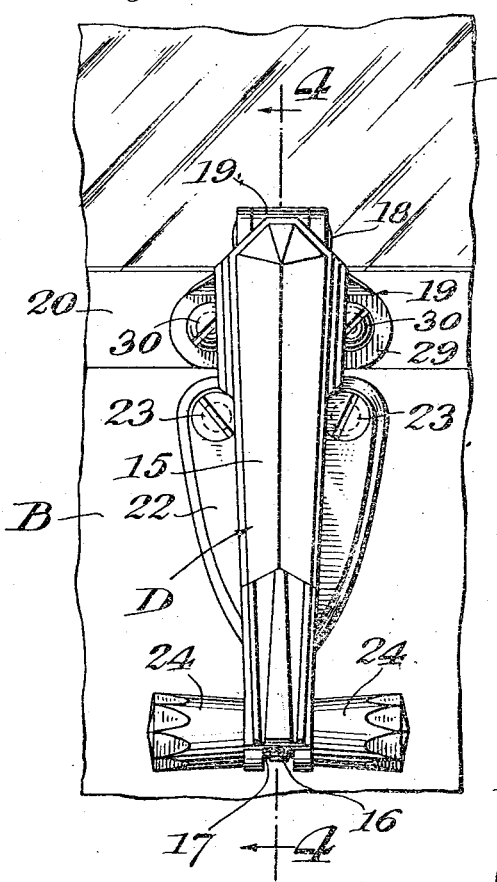
Fig. 2 is an enlarged elevation, looking from the interior of the car, of the securing device and adjacent parts, showing the windshield in closed position.

In Fig. 1 is shown a portion of a motor vehicle body having a windshield header A, a windshield belt panel B, a windshield C hinged at its upper edge to the header A and closing at its lower edge against the belt panel B, and a toggle device D cooperating with the lower edge of the windshield C intermediate the ends of the latter for securing or holding the windshield in closed or open position.

Figure 3:
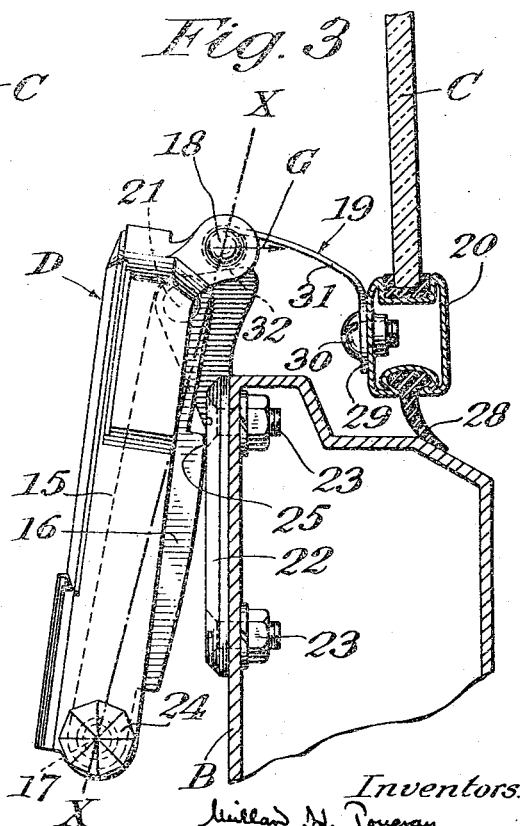
Fig. 3 is an elevation of the parts shown in Fig. 2, looking from the right in the latter figure, the windshield and belt panel being shown in section.

The construction of the toggle device D is shown in detail in Figs. 2 to 5 inclusive. Said device comprises two toggle links or members 15 and 16 pivotally connected at their adjacent ends to each other at 17, the member 15 having at its outer end a pivotal connection 18 with a bracket 19 secured to the windshield frame 20, and the member 16 having at its outer end a pivotal connection 21 with a bracket 22 secured as by bolts 23 to the belt panel B. The pivotal connection 17 is provided with a suitable handle 24 by which the device can be conveniently operated to open or close the windshield. The toggle member 15 is made of hollow or channel form to receive the toggle member 16, so that the two can close on one another like a jackknife, as shown in Fig. 3 and in broken lines in Fig. 4.

When the windshield is closed, the parts assume the position last referred to. The parts are so designed that when in this position the axis of the pivotal connection 21 lies to the left of the line X—X connecting the axes of the pivots 17 and 18, thereby locking the parts in closed position against forces acting along the latter line, the toggle member 16 having an abutment 25 which, when the parts are in this position, engages the face of the bracket 22. To open the windshield, the handle 24 is grasped and is swung about the axis of the pivot 21 through the position shown in full lines in Fig. 4 and through the position shown in broken lines in Fig. 5 into the position shown in full lines in the latter figure, which carries the axis of the pivot 17 slightly beyond the line Y—Y connecting the axes of the pivots 18 and 21 and brings shoulders 26 and 27 on the members 15 and 16 respectively into engagement with one another, thereby holding the windshield in open position.

In order to hold the parts tight, so as to prevent rattling and exclude the weather, it is desirable that the toggle device be so designed that when in the position to secure the windshield closed, as shown in Fig. 3, it will exert upon said windshield a substantial closing pressure, which pressure, due to the location of the device, is applied to the lower edge of the windshield at a point intermediate the ends of the latter. In accordance with present practice it is customary to support swinging windshields, of the type shown, when closed, only at their ends or vertical edges, by engagement with the front pillars E (Fig. 6), the engagement of the lower edge of the windshield with the belt panel B being solely through a flexible weather or packing strip 28 affording no support. Consequently the clamping pressure applied to the unsupported lower edge of the windshield intermediate the ends of the latter, as indicated at F in Fig. 6, tends to distort said lower edge out of its normal straight line as indicated, with considerable exaggeration, in broken lines in said figure, with a resulting tendency to cause breakage of the windshield as above stated. In order to avoid this, and in accordance with the present invention, the bracket 19 is of resilient construction, being, in the form of the invention shown, composed of resilient sheet metal and comprising a base portion 29 secured, as by screws 30, to the windshield frame 20 and a curved inwardly extending arm 31 carrying at its end the pivot 18. By this construction the closing pressure exerted by the toggle device upon the unsupported lower edge of the windshield is yieldingly and resiliently transmitted to the latter, and it has been found in practice that this effectually overcomes the difficulty in question.

By reference to Fig. 3 it will be seen that when the windshield is closed the axes of the pivots 18 and 21 are out of alinement and the outward thrust or reaction of said windshield, transmitted through the bracket 19 to the pivot 18, acts upon the latter in the direction of the arrow G, or above the axis of the pivot 21 and at a considerable angle to the line X—X, thereby producing a moment about the axis of the pivot 21 tending to move the pivot 17 in a clockwise direction about said axis to unlock the windshield. Due to the fact that the line of action of this force passes relatively close to the axis, this moment is a small one which is normally ineffective by reason of the resistance imposed by the weight of the parts and the friction between them, but it is found in practice that under the influence of road shocks this resistance is overcome and the windshield becomes unlocked and flies open. In order to avoid this, and in accordance with the present invention, means are provided for locking the toggle in position to secure the windshield closed, said means comprising a support for the toggle, and particularly for the pivotal connection 18, adapted to hold the same against the outward thrust of the windshield as applied to said pivot along the line G. In the construction shown, the bracket 22 is formed with an upwardly and forwardly inclined shoulder 32 against which the pivotal connection 18 is pressed by the resilient bracket 19 when the windshield is closed, the forward end of said shoulder being sufficiently elevated to positively prevent movement of the pivot 18 in the direction of the arrow G out of the position shown in Fig. 3, and therefore rendering the outward thrust of the windshield ineffective to unlock the toggle. The shoulder 32 however in no wise interferes with the manipulation of the toggle through the handle 24, since it will be seen that movement of said toggle by said handle from the position shown in Fig. 3 and in broken lines in Fig. 4 into the position shown in full lines in the latter figure, causes the pivot 18 to ride downwardly or toward the left on said shoulder after which it is moved away from it. Movement of the toggle by the handle 24 from the position shown in full lines in Fig. 4 into the position shown in broken lines therein to lock the windshield, causes the pivot 18 to ride up or toward the right on the shoulder 32, the bracket 19 yielding if necessary for this purpose, until it reaches the position shown in Fig. 3, wherein it is tightly wedged against said shoulder and thereby effectively locked against the outward reaction of the windshield above referred to.

Having thus described our invention, we claim:

1. In a vehicle body, the combination with a windshield, of a toggle acting upon an unsupported edge of said windshield intermediate its ends to clamp said windshield in closed position, and a resilient bracket connecting said windshield and toggle.

2. In a vehicle body, the combination with a windshield, of a toggle acting upon an unsupported edge of said windshield intermediate its ends to clamp said windshield in closed position, and a curved, resilient sheet metal bracket secured at one end to said windshield and pivoted at its opposite end to the adjacent member of said toggle.

3. In a vehicle body, the combination with a windshield and belt panel toward which said windshield closes leaving its lower edge unsupported, of a resilient bracket carried by the unsupported edge of said windshield intermediate its ends, and a toggle comprising members pivotally connected at their adjacent ends to each other and at their outer ends to said belt panel and bracket respectively.

4. In a vehicle body, the combination with a windshield, of a toggle for securing said windshield in closed position, means for supporting said toggle against the outward thrust of said windshield, and resilient means for forcing said toggle into engagement with said supporting means.

5. In a vehicle body, the combination with a windshield, of a toggle for securing said windshield in closed position, means for supporting said toggle against the outward thrust of said windshield, and resilient means connecting said windshield and toggle for forcing the latter into engagement with said supporting means.

6. In a vehicle body, the combination with a windshield and a belt panel toward which said windshield closes, of a resilient bracket secured to said windshield, a toggle comprising two members pivotally connected at their adjacent ends to each other, a pivotal connection between the outer end of one of said members and said belt panel, a pivotal connection between the outer end of the other of said members and said resilient brackets, the axes of said three pivotal connections being out of alinement when said windshield is closed, and means for supporting said last named pivotal connection against the outward thrust of said windshield when the latter is closed.

7. In a vehicle body, the combination with a windshield and a belt panel toward which said windshield closes, of a resilient bracket secured to said windshield, a toggle comprising two members pivotally connected at their adjacent ends to each other, a pivotal connection between the outer end of one of said members and said belt panel, a pivotal connection between the outer end of the other of said members and said bracket, and a fixed support having an inclined shoulder against which said last named pivotal connection is resiliently forced by said bracket when said windshield is closed.

8. In a vehicle body, the combination with a windshield and a belt panel toward which said windshield closes, of a resilient bracket secured to said windshield, a second bracket secured to said belt panel, a toggle comprising two members pivotally connected at their adjacent ends to each other, a pivotal connection between the outer end of one of said members and said bracket, and a pivotal connection between the outer end of the other of said members and said resilient bracket, said second bracket having a shoulder arranged to support said last named pivotal connection against the outward thrust of said windshield when the latter is closed.

In testimony whereof we affix our signatures.

MILLARD H. TONCRAY.
JAMES W. GREIG.